United States Patent [19]
Seybold

[11] Patent Number: 5,877,758
[45] Date of Patent: Mar. 2, 1999

[54] SYSTEM AND METHOD FOR USING A SLIDER CONTROL FOR CONTROLLING PARAMETERS OF A DISPLAY ITEM

[75] Inventor: Charles Allen Seybold, Issaquah, Wash.

[73] Assignee: Microsoft Corporation, Redmond, Wash.

[21] Appl. No.: 753,284

[22] Filed: Nov. 22, 1996

[51] Int. Cl.[6] .................................................. G06F 3/14
[52] U.S. Cl. ..................................... 345/339; 345/974
[58] Field of Search .................................. 345/352, 354, 345/326, 333, 334, 339, 348, 349, 961, 963, 974, 341, 970, 973; 364/188

[56] References Cited

U.S. PATENT DOCUMENTS

| | | | |
|---|---|---|---|
| 4,896,291 | 1/1990 | Gest et al. ................................ | 345/353 |
| 5,491,781 | 2/1996 | Gasperina ................................ | 345/341 |
| 5,491,782 | 2/1996 | King et al. ............................... | 345/349 |
| 5,526,480 | 6/1996 | Gibson .................................... | 345/302 |
| 5,559,301 | 9/1996 | Bryan, Jr. et al. ........................ | 84/653 |
| 5,615,347 | 3/1997 | Davis et al. ............................. | 345/349 |
| 5,623,590 | 4/1997 | Becker et al. ........................... | 345/326 |
| 5,666,504 | 9/1997 | Crutcher ................................. | 345/355 |
| 5,680,560 | 10/1997 | Gaertner ................................ | 345/339 |
| 5,710,899 | 1/1998 | Eick ....................................... | 345/339 |
| 5,751,285 | 5/1998 | Kashiwagi et al. ...................... | 345/349 |

OTHER PUBLICATIONS

Koike et al., "TimeSlider: An Interface to Specify Time Point", UIST '97, pp.43–44, 1997.
"Slider Procedures," *Microsoft Visual Test 4.0 Language Reference—Microsoft Development Library*, © 1992–1995 Microsoft Corporation, 11 pages.
"CSliderCtrl," *Visual C++ 4.0 Class Library Reference—Microsoft Development Library*, © 1992–1995 Microsoft Corporation, 14 pages.
"Scroll Event," *Visual Basic Professional and Enterprise Editions: Custom Control Reference—Microsoft Development Library*, © 1992–1995 Microsoft Corporation, 1 page.
"Scroll Bars, Sliders, Spin Controls, and Buddy Controls," *Microsoft Visual Test 4.0 Programmer's Guide—Microsoft Development Library*, © 1992–1995 Microsoft Corporation, 1 page.
"Messages to Trackbars," *Win32 SDK:Win32, Overviews, Windows—Microsoft Development Library*, © 1992–1995 Microsoft Corporation, 2 pages.
"Slider: Implements the Trackbar Common Control in Windows 95," *Tech Samples: Win32 and Windows NT—Microsoft Development Library*, © 1992–1995 Microsoft Corporation, 1 page.
"12.1.6 Trackbar," *Win 3.1 SDK: Windows for Workgroups Reference—Microsoft Development Library*, © 1992–1995 Microsoft Corporation, 1 page.

*Primary Examiner*—Matthew M. Kim
*Assistant Examiner*—Crescelle N. dela Torre
*Attorney, Agent, or Firm*—Jones & Askew, LLP

[57] ABSTRACT

A control device for adjusting multiple parameters associated with an element or item of a user interface in an easy and intuitive manner. A slider control can be used to change the format or appearance of a timescale presented by the user interface. By using a single visual interface control, a slider control, a time-based scaling of a given view can be easily switched between predefined timescale settings for the timescale. The slider control, which comprises a fob and a rail, can control the parameters that dictate the appearance of the timescale, such as time units, date format, and labels. Once selected, the fob can be moved along the rail to a stop associated with parameter values for the timescale. The presentation of the timescale can be varied by moving the fob from one stop to the next stop along the rail, thereby varying the parameters defining the appearance of the timescale. A label containing information about the current time-setting for the slide control can be displayed in response to placing the cursor within the boundary for the slider control. In addition, a label is displayed adjacent to a stop as the fob moves along the rail and proximate to that stop, thereby advising the user of the time setting associated with that stop.

7 Claims, 9 Drawing Sheets

FIG. 1

Fig_2A

Fig_3B

Fig. 4

SYSTEM AND METHOD FOR USING A SLIDER CONTROL FOR CONTROLLING PARAMETERS OF A DISPLAY ITEM

FIELD OF THE INVENTION

The present invention relates to a control mechanism for changing parameters of an item of a user interface presented by a computer program, and more particularly relates to changing multiple parameters of a timescale presented by a graphical user interface by operation of a slider control.

BACKGROUND OF THE INVENTION

A display interface, such as a graphical user interface (GUI), represents a well known presentation medium for displaying computer data to a user. A GUI typically comprises a variety of display items, each having an appearance defined by one or more controllable parameters. Because users often have different views about the way a GUI should look, computer software designers have created controls that allow users to change these parameters and to customize the appearance of the GUI.

A dialog is a typical control device for enabling a user to view and select desired parameters to control the appearance of a display item. From a user's perspective, a dialog often presents a wide variety of possible control options, each requiring the user to readily understand its operation based on the text or image associated with a particular control. A "busy" dialog can offer a rather intimidating display for the typical user because it fails to support intuitive control operations. In other words, a dialog typically provides the typical user with multiple discrete options for varying the presentation of a display item, which can often lead to a user's confusion regarding the associated control operations.

Prior mechanisms for controlling parameters of a display interface also include radio buttons and pull-down menus. For radio buttons, the user typically moves the cursor onto a button associated with the desired parameter and then selects the button to change its state. Pull-down menus generally require the user to move the cursor to a desired menu, select the menu, find and select the desired parameter in the menu, and then release, thereby controlling the state of the desired parameter. To set multiple parameters, each of these prior control devices must be operated numerous times. This can be time consuming and tedious for the typical user.

A collection or set of radio buttons also presents a cluttered user interface and occupies a substantial amount of screen space. Tags or labels are typically placed proximate to radio buttons denoting the function of each button. Many programs are adapted for use in non-English speaking environments. Because each tag requires translation for a non-English speaking audience, the text and supporting source code for each tag would need to be modified. This presents time management issues for a programmer. Moreover, a translation of the tag text may lead to a translated tag occupying additional screen space, thereby contributing to an already cluttered user interface. Similar translation issues are presented by the text used in drop-down menus.

In view of the foregoing, there is a need in the art for a system for changing parameters of a controllable display item by use of a single control that provides an intuitive mechanism for varying the presentation of the display item. In addition, there is a need for a control mechanism that occupies a limited amount of screen space for a user interface, while providing control features that are easy for a typical user to operate to control parameters of a display item. There is a further need for a control mechanism for controlling the parameters of a display item in a manner that exhibits a universal view of operation.

SUMMARY OF THE INVENTION

The present invention is generally directed to a control that allows adjustment of multiple parameters associated with an element or item of a user interface, such as a graphical user interface (GUI), in an easy and efficient manner. A parameter is a variable that can be assigned different values for shaping the appearance of a display item. The value assigned to the parameter determines the appearance of the display item. The control allows a user to easily switch between display characteristics of the display item by controlling parameter values. The selection of a particular control setting of the control serves to select the parameter value for the display item. For example, a conventional slider control provides a control mechanism exhibiting an efficient and intuitive manner for changing the format or appearance of the display item, such as a timescale, presented by the GUI. By using a single visual interface control mechanism, such as the slider control, a time-based scaling of a given view can be easily switched between predefined time scalings.

A slider control is a control device, comprising a fob and a rail, useful for controlling the parameters of a display item. The fob is an indicator that can be selected by the user. The rail is a bar, typically positioned at a horizontal or vertical location of the user interface, which can include stops associated with control operations for predefined sets of parameters. Once selected, the fob can be moved along the rail to a desired position, typically a stop associated with parameter values for a display item. The presentation of the display item can be varied by moving the fob from one position to the next along the rail, thereby varying the parameters defining the appearance of this display item. The slider control is typically initialized in response to booting the computer, and initial parameters, including the size of the slider control, the number of tabs or stops, and the position of the slider control on the GUI, are defined during this initialization process.

The use of a slider control, as provided by the present invention, avoids the need for a user to use a dialog to select desired timescale parameters because the control operation for varying these parameters is presented to the user in a single control device. Although alternative controls, such as radio buttons or drop-down menus, can be used to adjust multiple parameters of a user interface, they typically use a large amount of real estate for the user interface and present a cluttered look. Neither radio buttons nor drop-down menu controls offer a universal control solution for controlling multiple parameters of a display item. Also, these controls suffer from the problem of displaying options via text-based menu items, which presents language translation problems for an application program that will be distributed on an international scale. Significantly, the slider control provides an optimum control mechanism, particularly when compared to the prior control mechanisms with respect to screen real estate and ease of use For one aspect of the present invention, the slider control can be implemented as a conventional control device, supported by the "WINDOWS" operating system, for controlling multiple parameters associated with the presentation of a timescale on a display screen. Timescales typically comprise a major timescale and a minor timescale, and each timescale can be viewed as a "ruler" that measures time along an axis. For example, the units of a major timescale can be weeks, and the units of a corresponding minor timescale can be days. By using a slider control, a user can adjust multiple parameters associated with the major and minor timescales, including date formats, time units (months, weeks, days, etc.) and labels (April, 1996, etc.) by selecting and sliding the fob along the rail until a desired stop is reached. In this manner, the time-based scaling of a screen of text and/or graphic information can be easily varied by a user based on the use of a single intuitive control device.

Timescale settings can be assigned to the stops of a horizontal (or vertical) slider, or the rail, and these stops are positioned at discrete intervals along the rail. Each stop or set point on the rail represents a different predefined set of parameters, and each set corresponds to a setting defining the appearance of a timescale. Because settings are packaged into specific control choices available via a single user interface control device, the user can use the slider control to achieve extensive customization of the timescale presented by the user interface. The fob can move along the rail and provides a visual target or handle for the user to view during cursor movement. A user can move the fob by placing the cursor proximate to the fob, depressing a mouse button, and moving the mouse to "drag" the indicator in the desired direction along the rail. When the user lets go of the mouse button, the fob moves to the closest stop along the rail and the presentation of the timescale is varied, as required, based on the time scale settings assigned to that stop. Typically, timescale settings can be linked to discrete stops or set points along the rail based on a "hard-coded" table stored within memory of the computer.

A "tool tip" can be displayed as a label, typically as information within a window, when the indicator is placed proximate to a stop on the rail. For example, the tool tip can present text-based feedback, i.e., a tip, regarding the timescale setting associated with the present stop. As the fob is moved from one stop to another stop, the text of the tool tip is updated based on the location of the fob along the rail. Thus, the information conveyed by the label for a tool tip changes as the fob moves from one stop to the next stop along the rail. In addition, the tool tip appears to move in the same direction as the fob is dragged by the user because the information within the tool tip is updated as the selected fob passes discrete points along the rail. A tool tip also can be provided when the user places the cursor proximate to the slider control, but without selecting the fob, thereby presenting the current control setting of the slider control to the user. For either the dynamic or static case, the tool tip is typically presented to the user in a readily readable form adjacent to the slider control.

The slider control can receive messages from the operating system, including messages regarding information associated with an input device, such as a pointing device capable of controlling the position of a pointer in response to movement of the mouse. A pointing device typically includes at least one control, such as a button, for sending control signals to the operating system based on the position of the button. Focusing on a mouse having at least one mouse button, the operating system can generate messages in response to mouse movement and mouse button position (UP or DOWN). Mouse event messages typically indicate the position of the cursor and the state of the mouse buttons. For example, in response to the user moving a pointing device, such as a mouse, to place a pointer or cursor proximate to the slider control while mouse buttons are in the UP position, the slider control will support the presentation of a tool tip containing text for the current timescale setting of the slider control. Timescale parameters typically can not be adjusted while the mouse buttons are in the UP position.

Timescale parameters can be adjusted, however, by moving the fob from its current stop position to another stop position. This control adjustment can be achieved by depressing the mouse button while the cursor is proximate to the fob and dragging the fob along the rail to the desired stop. The selected fob is moved along the rail by moving the mouse while maintaining the button in the DOWN position. The text of a tool tip can dynamically change in response to the location of the fob on the rail and will contain information regarding the stop located closest to the fob.

Typically, the user can move the selected fob along the rail to a desired stop based on an observation of the proximate location of the stop on the rail and the information presented by each tool tip. In response to a transition of a mouse button from a DOWN position to an UP position, the fob will snap to the closest stop on the rail and the underlying application program will assume the settings associated with that stop. Specifically, the slider control will notify the application program of a setting change by sending a message to the application. In response to this message, the application program will request the current stop position from the slider control. The application program will respond to the current stop position by looking at a hard-coded table and locating the parameters associated with that current stop position.

In view of the foregoing, these and other features, advantages, and aspects of the present invention may be more clearly understood and appreciated from a review of the following detailed description of the disclosed embodiments and by reference to the appended drawings and claims.

DETAILED DESCRIPTION

The present invention is generally directed to a computer-implemented system for controlling multiple parameters of a display item, such as a timescale, to vary the appearance of the display item by a user interface for a computer program. A control, preferably a slider control, can be used to vary the appearance of the display item by selecting a control setting that is associated with desired parameters for the display item. For example, a user can efficiently switch between predetermined parameters or settings of a display item by varying the position of the fob of the slide control between discrete points or stops along the rail of the slide control.

Briefly described, a slider control typically comprises a fob that can slide along a rail comprising multiple stops or set points associated with control selections. The fob is a visual indicator, selectable by the user, which can be moved along the rail to select a desired control operation typically associated with a stop on the rail. The rail is typically implemented as a horizontal (or vertical) bar having stops, which can be depicted as tick marks at spaced intervals along the rail. The fob sits on the rail and, for the representative example of a horizontal bar, can be moved left or right along the rail. An input device, such as a mouse or keyboard, can be used to select the fob in order to move it along the rail. The desired parameters for the display item can be established by selecting and dragging the fob to the corresponding stop on the rail.

The input device can be used to control the position of a pointer, typically a cursor, on the screen. As the cursor approaches the proximate location of the slider control, a "tool tip" can appear on the screen. The tool tip is a window that contains text-based and/or graphical information. For example, when the cursor approaches the window outline for the slider control, a tool tip appears near the slider control and displays information corresponding to the current position of the fob. This information, which is provided as a "tip" to support user operations of the underlying software module, describes the controllable timescale appearance associated with the stop where the fob rests. In addition, the information of the tool tip can dynamically change in response to moving the selected fob from a first stop to a second stop. Once the fob is located at the desired stop, the parameters of the display item are updated, thereby modifying the appearance of the user interface.

The Computing Environment

Figure 1:
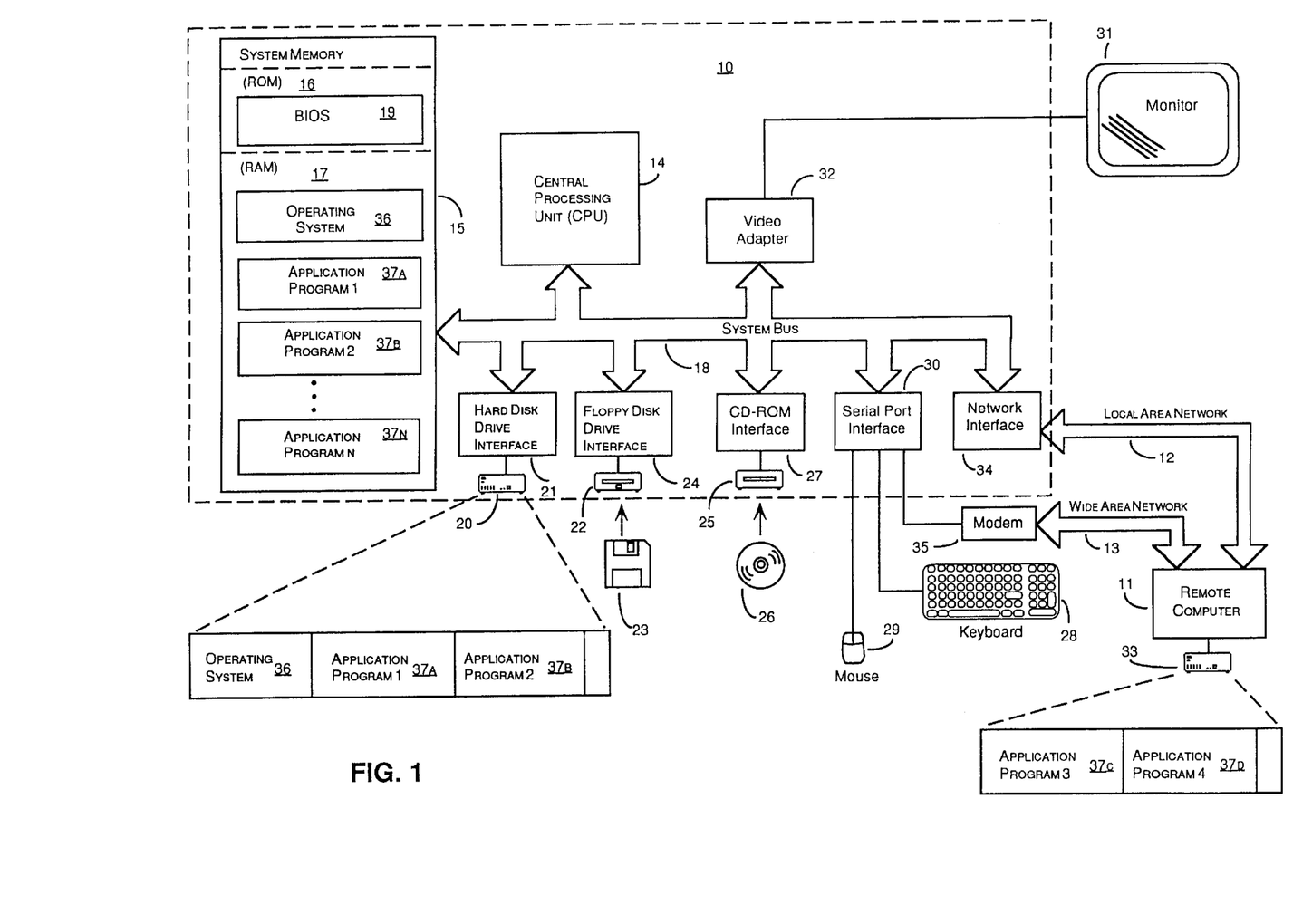
FIG. 1 is an illustration of the preferred operating environment of a personal computer for supporting operation of the present invention.

Turning now to a review of the representative computing environment, FIG. 1 illustrates a conventional personal computer 10 suitable for supporting the operation of an embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or compute server.

The personal computer 10 includes a processing unit 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the processing unit 14 by a system bus 18. The computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the computer 10, the computer-readable media include the local or remote memory storage devices, which may include the local hard disk drive 20, floppy disk 23, CD-ROM 26, RAM 17, ROM 16, and the remote memory storage device 33. In the personal computer 10, the local hard disk drive 20 is used to store data and programs, including the operating system and programs.

The preferred embodiment of the present invention is represented by the "TEAM MANAGER" program, which is an application program published by Microsoft Corporation of Redmond, Wash. Briefly described, the preferred program, which is represented in FIG. 1 as application program 37a, is a collaborative management tool that consolidates, coordinates, and tracks team activity. The program allows a user to consolidate, coordinate and track a project team's information such as the amount of work completed, or actual work, on an assignment. For example, the preferred program allows users to enter information describing available resources and tasks, and then generates a schedule based on the input information. Advantageously, the preferred program utilizes an assignment-oriented approach for generating a schedule, which results in maximizing the utilization of resources. The preferred application program presents a graphical user interface (GUI), and operates in tandem with the "WINDOWS 95" operating system, which is published by Microsoft Corporation of Redmond, Wash. This gives the user visual access to resource and task data, and direct ways to view and manipulate information.

In the "TEAM MANAGER" program, data is preferably stored in team-related files. For example, the user can create a Team File that contains information about team members and the tasks they work on. A subset of the data in the Team File can be graphically depicted as a part of a screen display, wherein the data subset is organized in a particular way, called a "view". Different views are organized around typical management activities. For example, a Workload Planner view allows the user to view tasks under way and the time set aside for the task to be completed. The Workload Planner view allows a user to visually determine how work tasks are distributed across members of the team.

The Workload Planner View—A Timescale Presentation of Information

FIGS. 2A–2D and 3A–3B are illustrations showing screen displays associated with the preferred program, Microsoft's "TEAM MANAGER" program. In particular, these screen displays, each presented in a window 100, illustrate the Workload Planner view that shows team information, including task name and each person assigned to a task. The Workload Planner view allows a user to view tasks for a team project and the time and resource(s) allocated for each task to be completed.

Figure 2A:
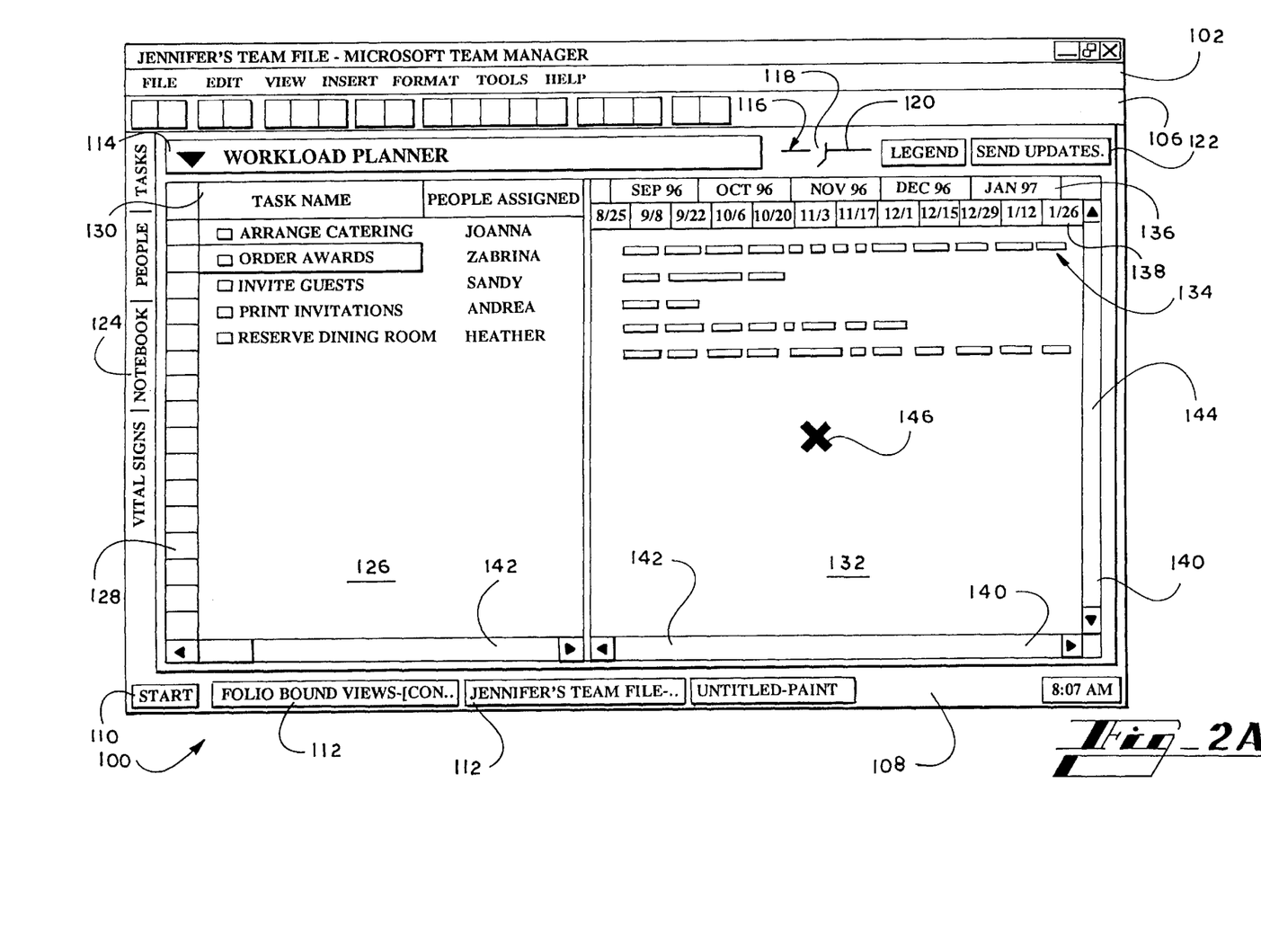
FIGS. 2A, 2B, 2C, and 2D, collectively described as FIG. 2, are screen displays illustrating a slider control for selecting a timescale setting of a user interface in accordance with an exemplary embodiment of the present invention.

Those skilled in the art will recognize conventional display items or elements shown in the screen displays for the Workload Planner view. As best shown in FIG. 2A, menu bar 102, which is located near the top of the screen, contains several pull-down menus 104. The pull-down menus on the menu bar 102 allow the user to perform such tasks as editing, formatting and viewing files. A main tool bar 106, which is located below the menu bar 102, allows the user to perform common commands by selecting buttons located on the tool bar. A status bar 108 is located near the bottom of the screen and contains a return to a Program Manager button 110, and buttons for switching to other open applications 112.

A view banner 114, which displays "WORKLOAD PLANNER," is located on the left-hand side of the screen, beneath the main tool bar 106, to describe the current view. The view banner 114 allows the user to select the manner that information in the Team File is graphically depicted, i.e., a "view". For example, a view is selected when the user chooses the desired view from a drop-down menu activated by selecting the inverted triangle on the left-hand side of the view banner 114.

The selection of the send updates button 122 allows a team manager to send updated task-related information to team members via electronic mail. Tabs 124 are positioned vertically along the left hand side of the screen. The tabs 124 allow the user to view team information associated with a particular management activity. One of the tabs 124 can be selected when the user positions the cursor over the desired tab and depresses a button of the mouse. For example, to select the Workload Planner view, the "Tasks" tab must be selected. The Workload Planner view could not be selected if, for example, the "People" tab was selected.

The window 100 is divided into two halves, a window 126, located on the left, for viewing tasks and people and a window 132, located on the right, for viewing time. The window 126 can list all task names and the people assigned to complete those tasks, as entered in the Team File. The window 126 preferably includes a column 128 for tasks and a column 130 for task names entered in the Team File. The columns 128 and 130 allow the user to easily identify the task-related items listed within these columns. The window 132 includes a timescale 134 comprising an upper timescale 136 and a lower timescale 138. The upper timescale 136 can be viewed as a major timescale and the lower timescale 138 as a minor timescale. For example, the units of a major timescale 136 can be weeks and the units of a corresponding minor timescale 138 can be days, wherein the listed days correspond to weeks recited by the major timescale.

A horizontal scroll bar 142 is located along the bottom of each of the window 126 and the window 132. A vertical scroll bar 144 is provided on the right hand side of the window 132. The horizontal and vertical scroll bars, 142 and 144, allow the user to adjust the size of displayed view information to accommodate information that is larger than the available screen space. By selecting and moving the control item within the scroll bars 142 and 144, information on the screen is shifted so that the user can view the desired portion of the information. A visual indicator 146, shown as a cursor, is located in the window 100. An input device, such as a mouse or a keyboard, can be used to control the position of the cursor 146. Those skilled in the art will appreciate that other types of input devices can be used to input data and to control the position of the cursor on the screen.

For the preferred embodiment, the display item is a time scale, such as the timescale 134. The slider control allows the user to choose the timescale settings of the timescale 134 by operating the slider control in an intuitive and efficient manner. A timescale setting is a predefined combination of parameters, such as date formats, time units and labels, which define the appearance of the timescale 134. Preferred timescale settings are: daily, weekly, biweekly, semimonthly, monthly, or quarterly. For example, if the timescale setting is daily, the parameters of the upper timescale 136 will be set to represent weeks in a month and the parameters of the lower timescale 138 will be set to represent days of the listed weeks. For a weekly timescale setting, the parameters of the upper timescale 136 will be set to represent month(s) of the year and the parameters of the lower timescale 138 will be set to represent weeks of the month(s).

Figure 2B:
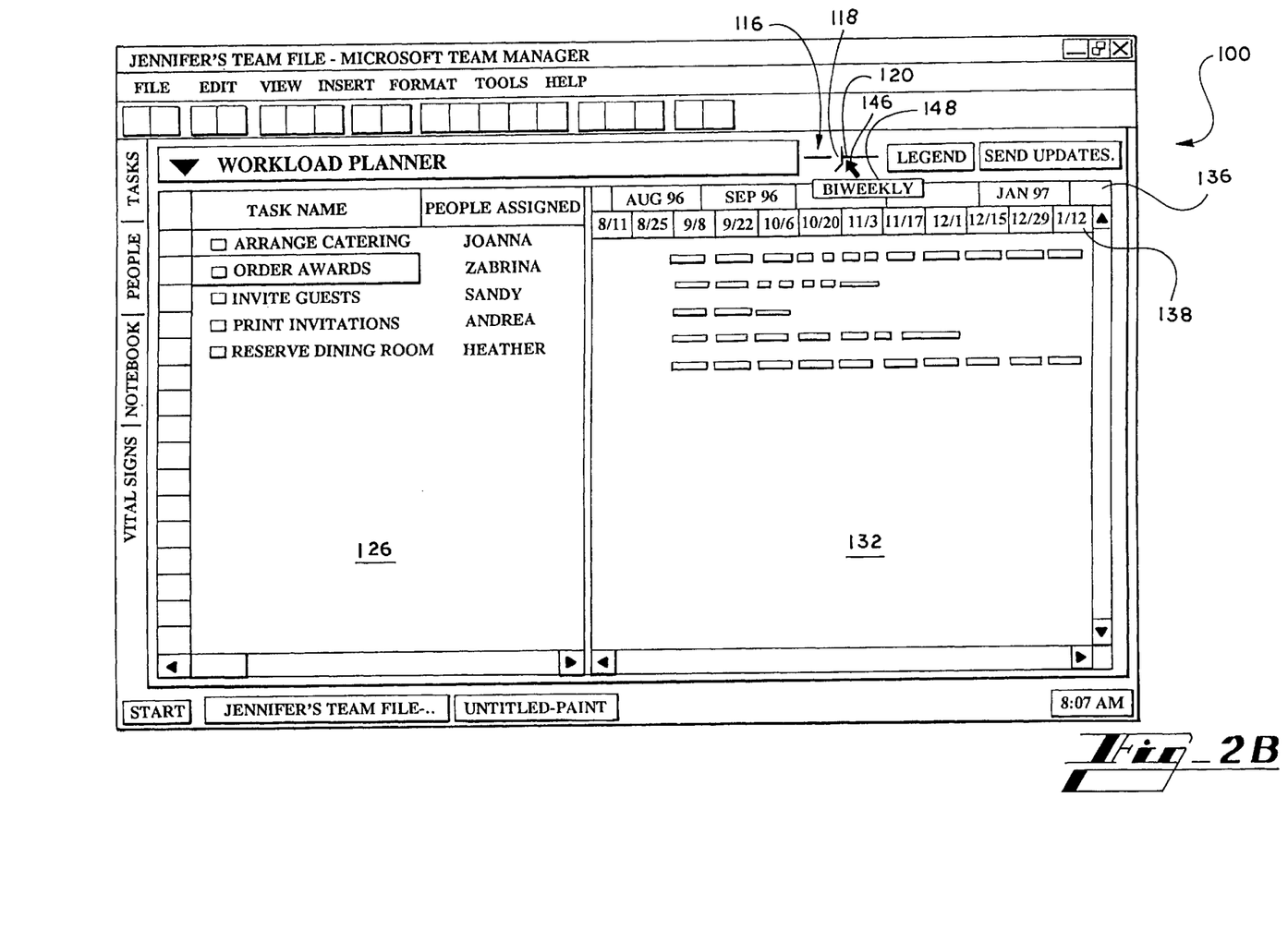
Figure 2C:
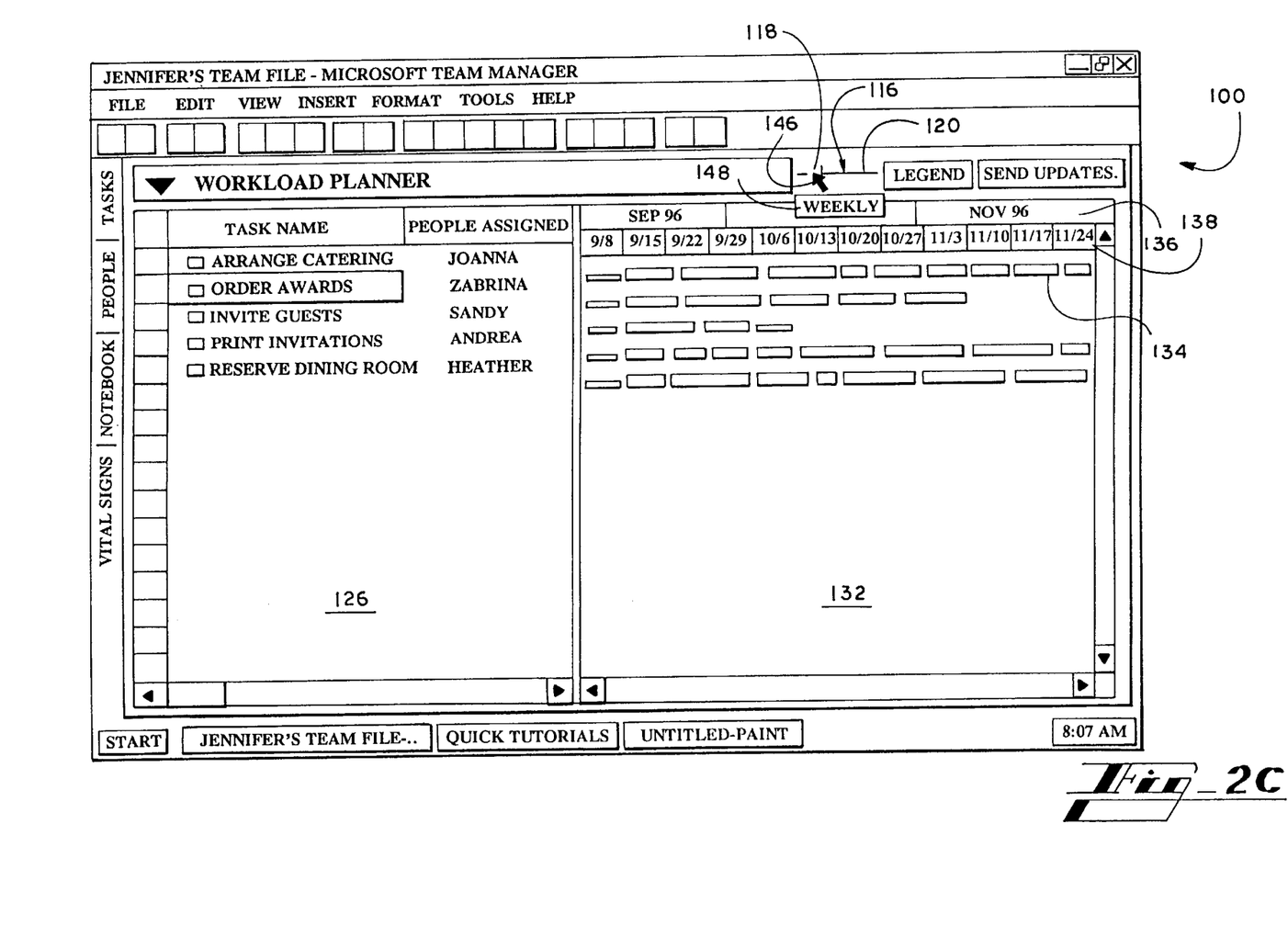
Figure 2D:
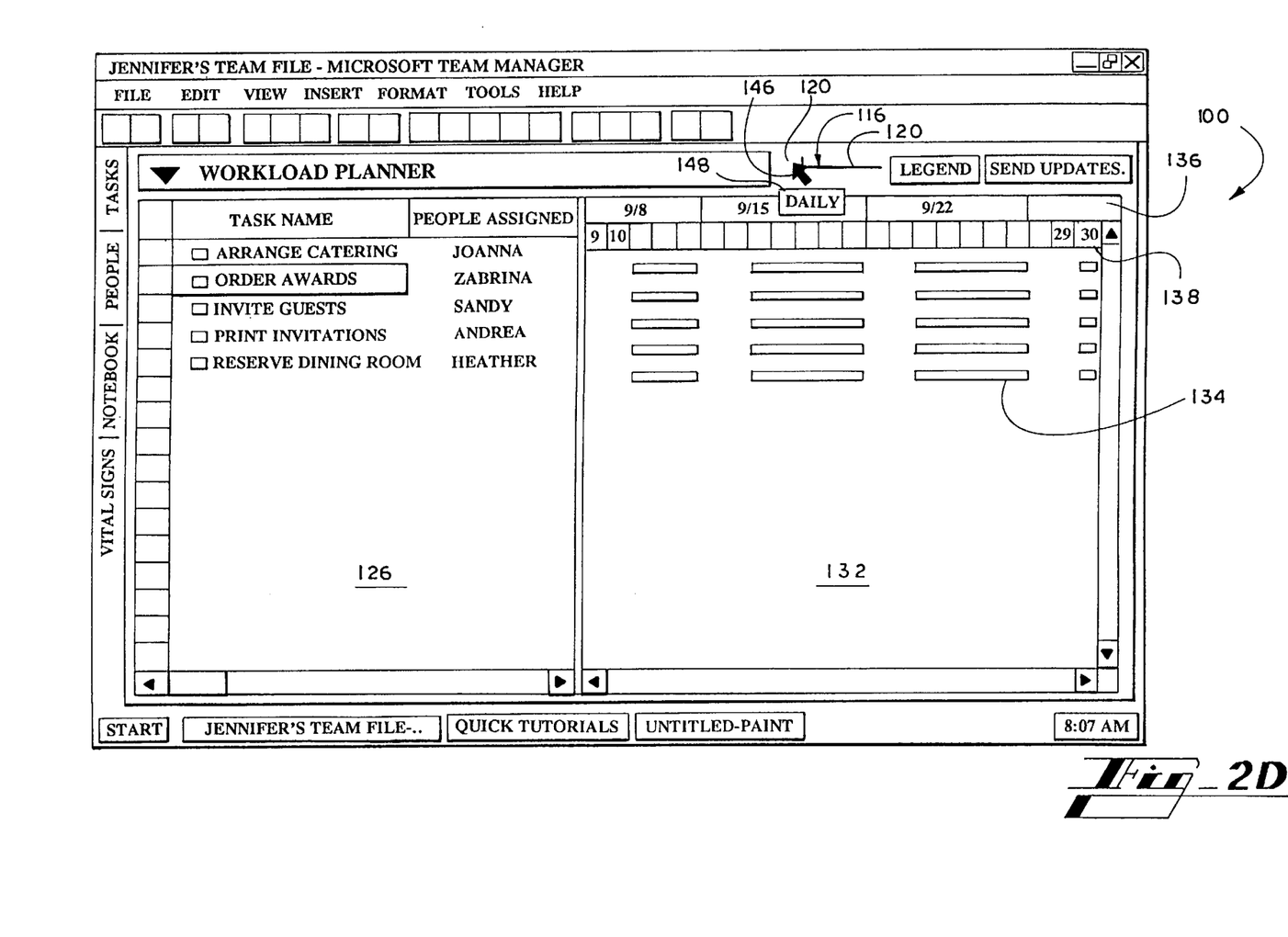
Figure 3A:
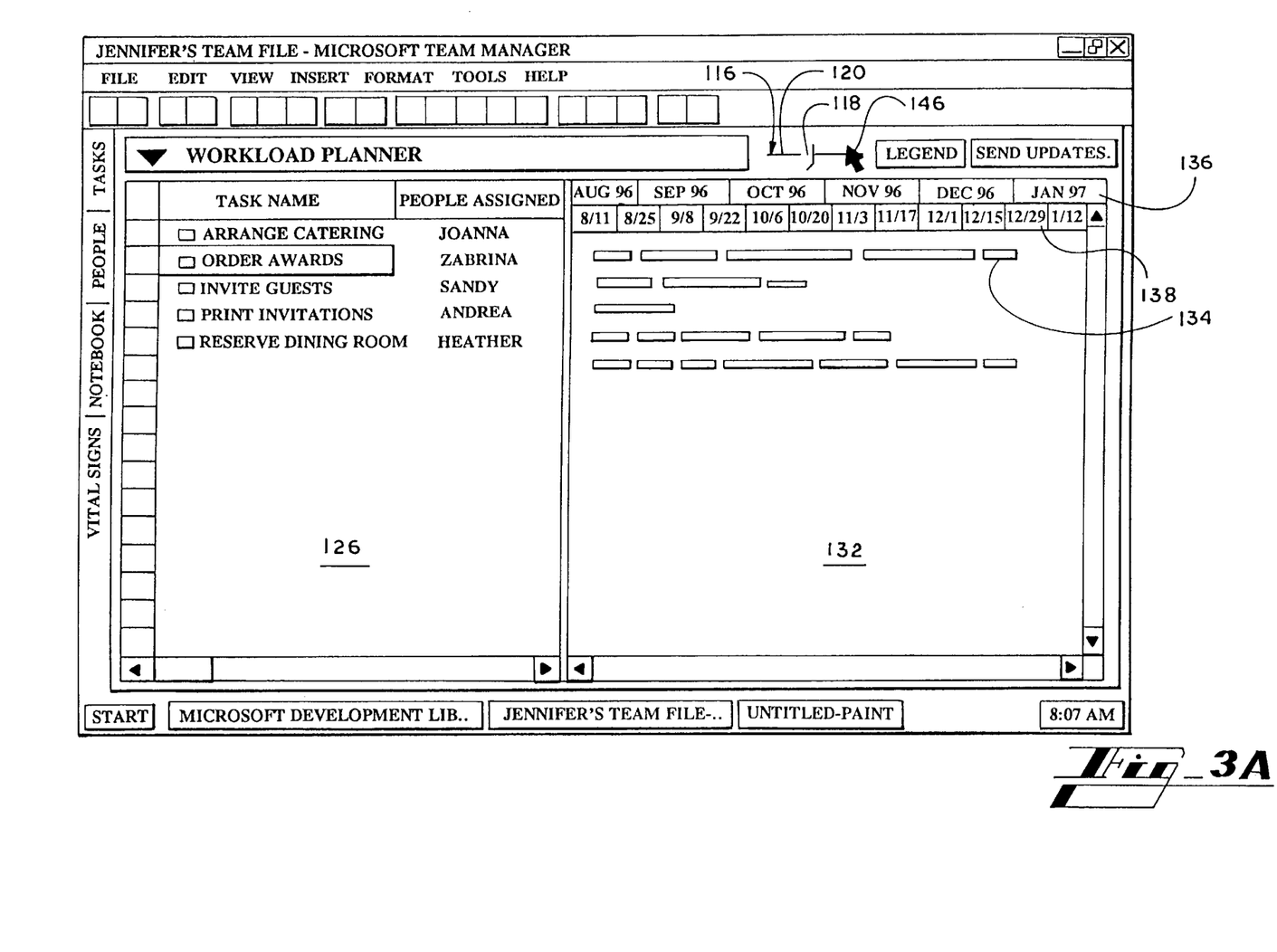
FIGS. 3A and 3B, collectively described as FIG. 3, are screen displays illustrating a slider control for selecting an alternative timescale setting of a user interface in accordance with an exemplary embodiment of the present invention.
Figure 3B:
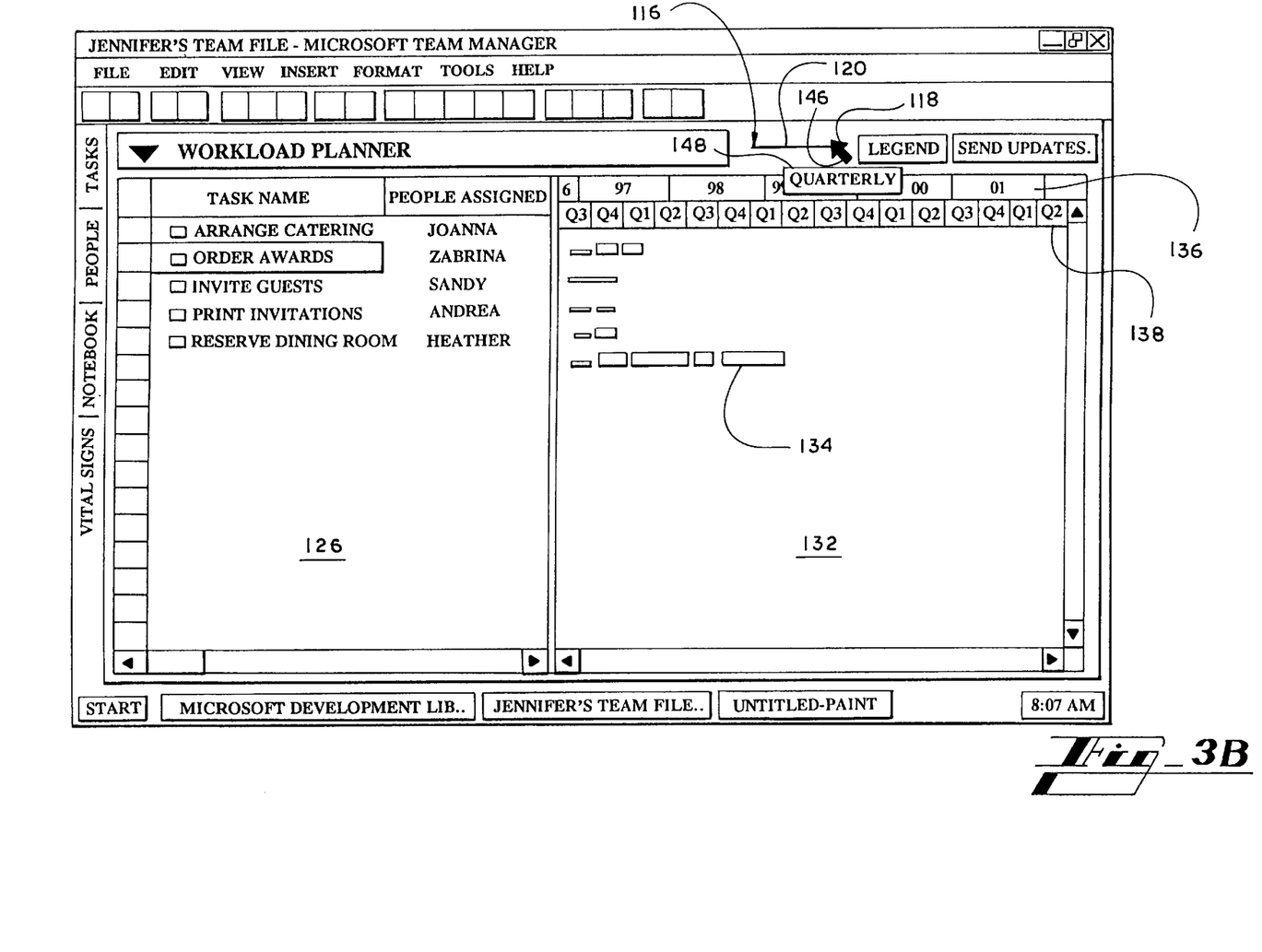

A conventional control device, a slider control 116 comprising a fob 118 and a rail 120, is located adjacent the view banner 114. The fob 118 is a handle that can be selected by the user and dragged to a stop along the rail 120. The rail 120 is a bar with discrete set of staggered stops, each stop representing a timescale setting for the timescale 134. For example, for a horizontal bar, the fob 118 preferably sits along the rail 120 and may be moved to the left or the right. The user can drag the fob 118 along the rail 120 of the slider control 116 to the stop designating the desired timescale setting. Optional tick marks can be displayed along the bar to provide a visual indication of the location of corresponding stops. Although the rail 120 is shown in FIGS. 2 and 3 as a horizontal bar, those skilled in the art will appreciate that the rail 120 can be positioned in a variety of positions for the window 100.

In FIG. 2A, a subset of the team data maintained in the Team File, the tasks and the assigned resources, are shown within the window 126. The allocation of these resources over time is shown within the window 132, based on the selected time settings for the timescale 134, i.e., months for the upper timescale 136 and biweekly for the lower timescale 138. The cursor 146 is shown at rest in the window 132. It will be understood that the slider control 116 can be operated to vary the appearance of the timescale 134 by selecting a desired timescale setting. The fob 118 is positioned along the bar at one of the spaced-apart stops of the rail 120. As best shown in FIGS. 2B–2D, this control operation can be accomplished by moving the fob 118 along the rail 120 to a desired stop associated with the desired timescale setting, thereby changing the parameters of the timescale 134.

In FIG. 2B, the user has now used an input device to position the cursor 146 in an area proximate to the slider control 116. For purposes of discussion with respect to FIGS. 2 and 3, the input device is represented by a mouse having at least one button. In response to the position of the cursor 146, a label containing text, called a "tool tip" 148, appears on the screen to describe the current timescale setting selected by the slider control 116. The appearance of the tool tip, which is placed adjacent to the slider control 116, depends on the location of the cursor. Unlike dynamic tool tips that will be described below with respect to FIGS. 2C and 2D, there is no requirement for the user to depress a mouse button to enable the tool tip to appear on the screen. Instead, the cursor 146 need only be positioned proximate to a window associated with the slider control 116 for the tool tip 148 to appear on the screen. The tool tip 148 is preferably presented adjacent to the slider control 116 and proximate to the resting position of the fob 118. Moreover, the timescale setting displayed by the text of the tool tip 148 is determined by the present location of the fob 118, which rests at one of the discrete stops along the rail 120. For example, each stop of the rail 120 is associated with a certain timescale setting, and the text of a displayed tool tip is dictated by the corresponding stop that the cursor is positioned proximate to. For the preferred embodiment, the information presented by the tool tip is in the form of text defining daily, weekly, bi-weekly, semi-monthly, monthly or quarterly control options for the slider control 116.

As illustrated in FIGS. 2B and 2C, the user can position the cursor 146 over the slider control 116 without changing the setting of the slider control 116, so long as a mouse button is not depressed. To change the control selection of the slider control 116, however, the user can position the cursor 146 proximate to the fob 118 on the slider control 116 by moving the mouse. The user then depresses the mouse button while the cursor 146 is positioned proximate to the fob 118. This causes the fob 118 to be "grabbed" for operation by the user. The selected fob 118 can then be "dragged" along the rail 120 to a stop representing the desired timescale setting by moving the mouse while holding the mouse button in the depressed state.

As shown in FIGS. 2C and 2D, a tool tip 148 can appear in response to moving the fob 118 proximate to a stop on the rail 120 denoting a timescale setting. The text of the tool tip 148 changes to reflect the timescale setting corresponding to the current stop. In comparison to FIG. 2B, the fob 118 has moved to the left along the rail 120 in FIG. 2C, and the tool tip 148 is displayed proximate to the stop closest to the fob 118. The The text of the tool tip 148 now indicates that the fob 118 is located near the stop or setpoint associated with the "weekly" timescale for the time scale 134. Significantly, the user can continue to drag the fob 118 along the rail 120 until the desired timescale setting is reached. As the fob 118 is placed proximate to each set point, a tool tip is generated and displayed adjacent to that set point until the fob passes. In this manner, a series of tool tips, each displaying different information, can be presented in dynamic fashion to the user as the fob 118 moves along the rail and passes set points.

When the user releases the mouse button, the fob 118 is no longer selected for dragging operations, and it will "snap" to the closest stop on the rail 120, which typically corresponds to the desired timescale setting. Thus, the fob 118, once released, will move to the closest stop along the rail 120 and remain at that position until moved again by the user. In response to moving to the closest stop, a tool tip 148 will be generated and displayed to the user. As shown in FIGS. 2C and 2D, the user has moved the fob 118 from the stop associated with the "Weekly" setting to a stop at the far left of the rail 120, a stop associated with the "Daily" setting. As a result of this movement of the fob 118, the information presented by a tool tip changes because the fob has moved from one stop to the next. Indeed, the tool tip for the stop associated with the resting position of the fob, which is placed at the far left end of the rail, confirms that the "Daily" control setting for the slider control 116 has been selected by the user in FIG. 2D. In turn, the timescale settings are updated to modify the appearance of the user interface in response to the movement of the fob 118 to a new resting position for the slider control 116.

In summary, when the cursor 146 approaches the window outline for the slider control, a tool tip 148 can appear near the slider control 116 and display information corresponding to the current position of the fob 118, which is associated with the present selection for the presentation of the time scale 134. This information, which is provided as a "tip" to support user operations of the underlying software module, describes the controllable timescale appearance associated with the stop where the fob rests. In addition, the information of the tool tip can dynamically change in response to moving the selected fob from a first stop to a second stop. When the fob 116 is no longer selected, it moves to the closest stop on the rail 120, and the parameters of the timescale 134 are updated in accordance with the control operation for that stop, thereby modifying the appearance of the user interface.

Referring now to FIGS. 3A–3B, a timescale setting also can be selected in response to moving the cursor to a location proximate to the rail of the slider control and "clicking" a button of the mouse. The selected timescale setting corresponds to the stop on the rail closest to the position of the cursor when the mouse button transitions from the UP state to the DOWN state. In contrast to FIGS. 2A–2D, the fob itself is not dragged directly by the user to the desired timescale setting. Instead, the fob "snaps" to the stop closest to the location of the cursor in response to the mouse button transition.

Turning first to FIG. 3A, the cursor 146 is positioned in an area proximate to the slider control 116, specifically at one end of the rail 120. Typically, the cursor can be placed in this position in response to the user moving the mouse, thereby controlling the position of the cursor along the user interface. As previously described with respect to FIG. 2B, this action can cause the presentation of a tool tip (not shown) on the screen for describing the current timescale setting selected by the slider control 116 and the corresponding appearance of the timescale 134. The display of the tool tip, however, is preferably temporary and is presented for a predetermined time period. For the case shown in FIG. 3B, the tool tip is not shown because the time period for displaying the tool tip has expired.

As shown in FIG. 3B, the fob 118 has now moved from its position in FIG. 3A to the stop closest to the location of the cursor 146 because the user has depressed the mouse button while the cursor is placed along the rail 120. A tool tip 148 appears to define the modified timescale setting corresponding to the stop where the fob 118 is located. For the example shown in FIG. 3B, the tag "Quarterly" is displayed to advise the user that the quarterly time setting has been selected for the slider control 116. In turn, the presentation of the timescale 134 changes to reflect the new time setting for the slider control 116. No further action is taken by the slider control 116 in response to the user subsequently releasing the mouse button.

Turning now to a review of the slider control 116, the preferred control device is implemented as a "WINDOWS 95" control containing a fob, a rail and optional tick marks that indicate stops or set points. For example, the slider control can be built and tested under the "WINDOWS 95" operating system; however, the common control dynamic-link library (COMCTL32.DLL) included with the "WINDOWS 95" operating system is also supported for "WINDOWS 3.1" and "WINDOWS NT" operating systems via redistributable DLLs.

The CSliderCtrl class represents the preferred implementation of the slider control 116, which is also called a trackbar. A "slider control" is a window that contains a fob and a rail with optional tick marks. As illustrated above with respect to FIGS. 2 and 3, a slider control is useful for allowing the user to select a discrete value or a set of consecutive values in a range. When the user moves the fob along the rail, typically using either the mouse or the arrow keys, the slider control sends notification messages to indicate the change. For example, when the user drags the fob to the left or right along a horizontal rail, the slider control sends WM_HSCROLL messages to indicate the change in position of the fob. The fob value (or the position of the fob on the rail) can be extracted from the control device by calling the GetPos member function.

The slider element, also called the fob, in a slider control moves in increments specified upon initialization. For example, if it is specified that the slider control should have a range of five, the fob can only occupy six positions: a position at the left side of the slider control and one position for each increment in the range. Typically, each of these positions is identified by a stop or set point, which can be graphically highlighted by the use of optional tick marks placed along the rail.

Typical usage of a slider control is as follows: The control is created. If the control is specified in a dialog box template, creation is automatic when the dialog box is created. Alternatively, the Create member function can be used to create the control as a child window of any window. Various Set member functions can be called to set values for the control. The changes that can be made include setting the minimum and maximum positions for the slider, drawing tick marks, setting a selection range, and repositioning the slider.

An application program, such as the "TEAM MANAGER" program, can create a slider control by using the CreateWindow function and the TRACKBAR_CLASS class name. Table I contains a listing of the preferred statements for the creation of a slider control.

TABLE I include "commctrl.h"
HWND hwndTB;
hwndTB = CreateWindow(
TRACKBAR_CLASS,

TABLE I-continued

"",
WS_CHILD|WS_VISIBLE,
10,100,100,100,
hwndParent,
(HMENU) 1,
hinst,
NULL);

Once a slider has been created, the minimum and maximum positions for the slider can be set, optional tick marks drawn, and the selection set by using the messages as shown in Table II:

TABLE II

| TBM_CLEARSEL     | TBM_GETTICPOS   |
|------------------|-----------------|
| TBM_CLEARTICS    | TBM_SETPOS      |
| TBM_GETNUMTICS   | TBM_SETRANGE    |
| TBM_GBTPOS       | TBM_GETPTICS    |
| TBM_SETRANGEMAX  | TBM_SETSEL      |
| TBM_SETRANGEMIN  | TBM_SETSELEND   |
| TBM_GETRANGEMAX  | TBM_SETTIC      |
| TBM_GETRANGEMIN  | TBM_GETSELEND   |
| TBM_SETSELSTART  | TBM_GETTIC      |
| TBM_GETSELSTART  |                 |

Slider controls can have either a vertical or horizontal orientation. They can have stops on either side, both sides, or neither. They can also be used to specify a range of consecutive values. These properties are controlled by using slider control styles, which are specified when the slider control is created. The TBS_HORZ and TBS_VERT styles determine the orientation of the slider control. If the orientation is not specified, the slider control is oriented horizontally. The TBS_AUTOTICKS style creates a slider control that has a tick mark for each stop in its range of values. These tick marks are added automatically when the SetRange member function is called. If TBS_AUTOTICKS is not specified, member functions can be used, such as SetTic and SetTicFreq, to specify the positions of the tick marks. To create a slider control that does not display tick marks for the corresponding stops, the TBS_NOTICKS style can be used.

Tick marks can be displayed on either or both sides of the slider control. For horizontal slider controls, the TBS_BOTTOM or TBS_TOP style can be specified. For vertical slider controls, the TBS_RIGHT or TBS_LEFT style can be specified. (TBS_BOTTOM and TBS_RIGHT are the default settings.) For tick marks on both sides of the slider control in any orientation, specify the TBS_BOTH style.

A slider control can display a selection range only if the TBS_ENABLESELRANGE style is specified upon creation. When a slider control has this style, the tick marks at the starting and ending positions of a selection range are displayed as triangles (instead of vertical dashes) and the selection range is highlighted. For example, selection ranges might be useful in a simple scheduling application. The user could select a range of tick marks corresponding to hours in a day to identify a scheduled meeting time.

By default, the length of a slider control's slider varies as the selection range changes. If the slider control has the TBS_FIXEDLENGTH style, the length of the slider remains the same even if the selection range changes. A slider control that has the TBS_NOTHUMB style does not include a fob.

An application program can call the slider control's member functions to retrieve information about the slider control and to change its characteristics. To retrieve the position of the fob (that is, the value the user has chosen), the GetPos member function is used. To set the position of the fob, the SetPos member function is used. At any time the VerifyPos member function can be used to make sure that the fob is between the minimum and maximum values.

The range of a slider control is the set of contiguous values that the slider control can represent. Most application programs use the SetRange member function to set the range of a slider control when it is first created. Applications can dynamically alter the range after the slider control has been created by using the SetRangeMax and SetRangeMin member functions. An application that allows the range to be changed dynamically typically retrieves the final range settings when the user has finished working with the slider control. The GetRange, GetRangeMax, and GetRangeMin member functions are used to retrieve these settings.

An application can use the TBS_AUTOTICKS style to have a slider control's stops displayed automatically. If an application needs to control the position or frequency of the stops, however, a number of member functions can be used. To set the position of a stop, an application can use the SetTic member function. The SetTicFreq member function allows an application to set stops that appear at regular intervals in the slider control's range. For example, the application can use this member function to display only 10 stops in a range of 1 through 100.

To retrieve the index in the range corresponding to a stop, the GetTic member function is used. The GetTicArray member function retrieves an array of these indices. To retrieve the position of a stop, in client coordinates, the GetTicPos member function is used. An application program can retrieve the number of stops by using the GetNumTics member function. The ClearTics member function removes all of a slider control's tick marks.

A slider control's line size determines how far the fob moves when an application receives a TB_LINEDOWN or TB_LINEUP notification message. Similarly, the page size determines the response to the TB_PAGEDOWN and TB_PAGEUP notification messages. Applications can retrieve and set the line and page size values by using the GetLineSize, SetLineSize, GetPageSize, and SetPageSize member functions.

An application program can use member functions to retrieve the dimensions of a slider control. The GetThumbRect member function retrieves the bounding rectangle or window for the slider control. The GetChannelRect member function retrieves the bounding rectangle for the slider control's rail.

If a slider control has the TBS_ENABLESELRANGE style, the user can select a range of contiguous values from it. A number of member functions allow the selection range to be adjusted dynamically. The SetSelection member function sets the starting and ending positions of a selection. When the user has finished setting a selection range, an application program can retrieve the settings by using the GetSelection member function. To clear a user's selection, the ClearSel member function is used.

A slider control notifies its parent window of user actions by sending the parent WM_HSCROLL messages. The parent's OnHScroll member function can be overridden to handle these messages. This function will be passed a notification code, the position of the slider, and a pointer to the CSliderCtrl object. The pointer is of type CScrollBar even though it points to a CSliderCtrl object. This pointer may need to be typecast in order to manipulate the slider control.

Rather than using the scroll bar notification codes, slider controls send a different set of notification codes. A slider control sends the TB_BOTTOM, TB_LINEDOWN, TB_LINEUP, and TB_TOP notification codes only when the user interacts with a slider control by using the keyboard. The TB_THUMBPOSITION and TB_THUMBTRACK notification messages are only sent when the user is using the mouse. The TB_ENDTRACK, TB_PAGEDOWN, and TB_PAGEUP notification codes are sent in both cases.

Table III lists the slider control notification messages and the events (virtual-key codes or mouse events) that cause the notifications to be sent.

TABLE III

| Notification message | Event causing notification to be sent |
| --- | --- |
| TB_BOTTOM | VK_END |
| TB_ENDTRACK | WM_KEYUP (the user released a key that sent a relevant virtual-key code) |
| TB_LINEDOWN | VK_RIGHT or VK_DOWN |
| TB_LINEUP | VK_LEFT or VK_UP |
| TB_PAGEDOWN | VK_NEXT (the user clicked the channel below or to the right of the slider) |
| TB_PAGEUP | VK.PRIOR (the user clicked the channel above or to the left of the slider) |
| TB_THUMBPOSITION | WM_LBUTTONUP following a TB_THUMBTRACK notification message |
| TB_THUMBTRACK | Slider movement (the user dragged the slider) |
| TB_TOP | VK_HOME |

Selected slider control member functions are listed below in Table IV, as follows:

TABLE IV

CSliderCtrl::GetPos int GetPos() const;
Return Value

The current position.
Remarks

This function is called to retrieve the current position of the fob in a slider control.

CSliderCtrl::GetNumTics

UINT GetNumTics() const;
Return Value

The number of stops on the slider control.
Remarks

This function to retrieves the number of stops on a slider control.

CSliderCtrl::GetLineSize int GetLineSize() const;
Return Value

The size of a line for the slider control.
Remarks

This function is called to retrieve the size of the line for a slider control. The line size affects how much the fob moves for the TB_LINEUP and TB_LINEDOWN notifications. The default setting for the line size is 1.

CSliderCtrl::GetRange void GetRange(int& nMin, int& nMax) const;

| Parameters | Description |
| --- | --- |
| nMin | Reference to an integer that receives the minimum position. |
| nMax | Reference to an integer that receives the maximum position. |

TABLE IV-continued

Remarks

This function is called to retrieve the maximum and minimum positions for the fob on a slider control. This function copies the values into the integers referenced by nMin and nMax.

CSliderCtrl::GetRangeMax int GetRangeMax( ) const;
Return Value

The fob's maximum position.
Remarks

This function is called to retrieve the maximum position for the fob in a slider control.

CSliderCtrl::GetRangeMin int GetRangeMin() const;
Return Value

The fob's minimum position.
Remarks

This function is called to retrieve the minimum position for the fob in a slider control.

CSliderCtrl::GetTic int GetTic(int nTic) const;
Return Value

The position of the specified tick mark for a stop or 1 if nTic does not specify a valid index.

| Parameters | Description |
|---|---|
| nTic | Zero-based index identifying a stop; |

Remarks

This function is called to retrieve the position of a stop in a slider control.

CSliderCtrl::SetRange void SetRange(int nMin, int nMax, BOOL bRedraw = FALSE);

| Parameters | Description |
|---|---|
| nMin | Minimum position for the fob. |
| nMax | Maximum position for the fob. |
| bRedraw | The redraw flag. If this parameter is TRUE, the fob is redrawn after the range is set; otherwise the fob is not redrawn. |

Remarks

This function is called to set the range (minimum and maximum positions) for the fob in a slider control.

CSliderCtrl::SetRangeMax void SetRangeMax(int nMax, BOOL bRedraw = FALSE);

| Parameters | Description |
|---|---|
| nMax | Maximum position for the fob. |
| bRedraw | The redraw flag. If this parameter is TRUE, the fob is redrawn after the range is set; otherwise the fob is not redrawn. |

Remarks

This function is called to set the maximum range for the fob in a slider control.

CSliderCtrl::SetTicFreq void SetTicFreq(int nFreq);

| Parameters | Description |
|---|---|
| nFreq | Frequency of the stops. |

TABLE IV-continued

Remarks

This function is called to set the frequency with which stops are displayed as tick marks in a slider control. For example, if the frequency is set to 2, a tick mark is displayed for every other increment in the slider control's range. The default setting for the frequency is 1 (that is, every increment in the range is associated with a stop). The slider control must be created with the TBS_AUTOTICKS style to use this function.

---

Figure 4:
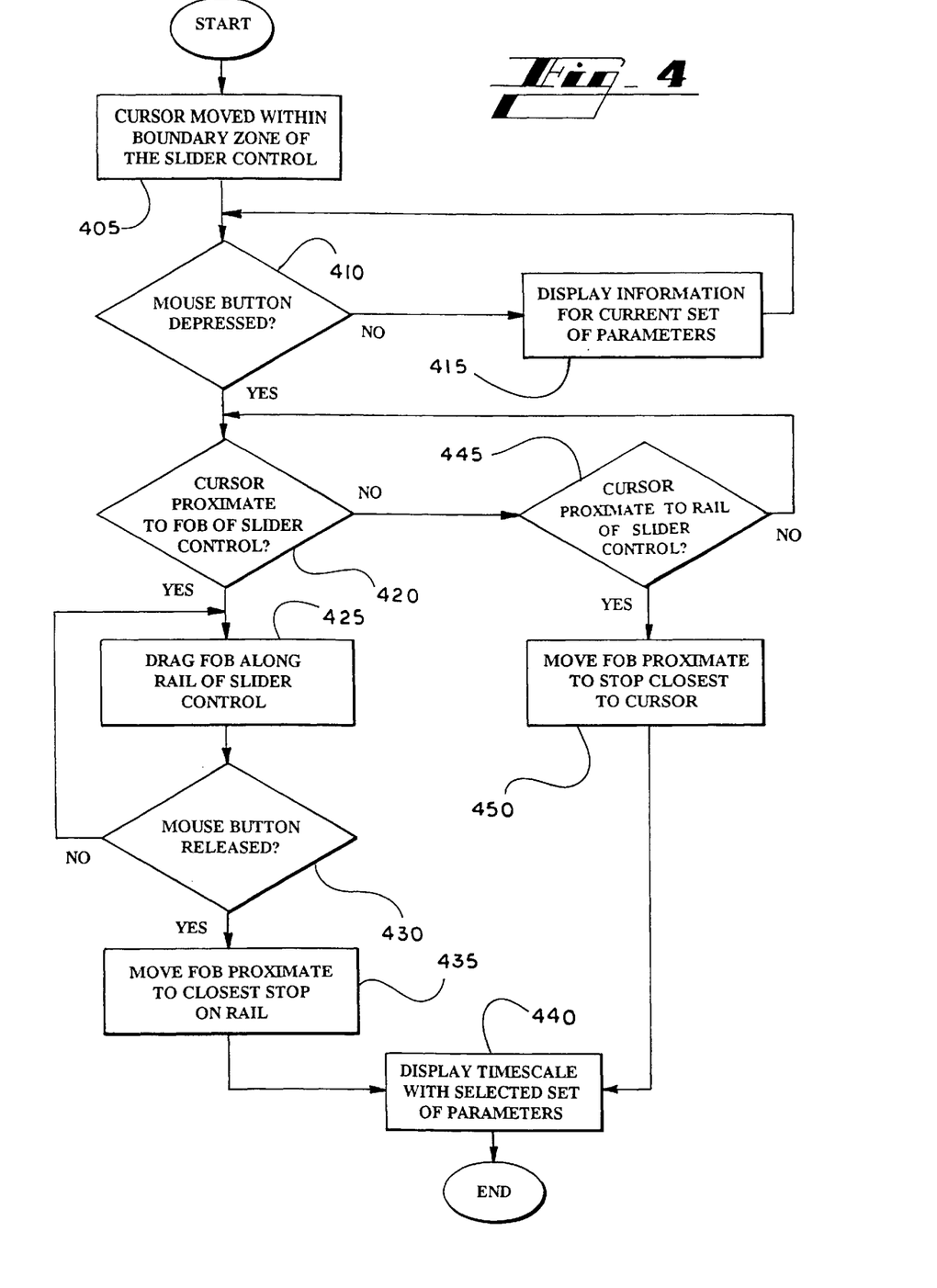
FIG. 4 is a flow diagram generally illustrating the steps completed by a user to control parameters of a display item for a user interface in accordance with an embodiment of the present invention.

FIG. 4 is a flow diagram that illustrates the steps completed by a user to control parameters of a display item for a user interface in accordance with an embodiment of the present invention. Turning now to FIGS. 2A–2D and 4, the method 400 begins at step 405 when the user activates the slider control 116 by moving the cursor 146 within the bounding rectangle or window defining the boundary of the slider control 116. As discussed above with respect to FIGS. 2A–2D, when the user moves the cursor 146 proximate to the slider control 116 while the mouse button is in the UP position, a tool tip 148 can appear on the screen to provide a visual indication of the current setting of the timescale slider. Thus, in step 410, an inquiry is conducted to determine if the mouse button is depressed while the cursor 146 is proximate to the slider control. If not, the "NO" branch is followed from step 410 to step 415, and information regarding the current selection of the slider control 116 is displayed to the user in the form of a tool tip. The process then returns to step 410 via a loop from step 415 to step 410. In contrast, if the mouse button is depressed, the "YES" branch is followed to step 420. An inquiry is conducted in step 420 to determine if the cursor 146 is placed over the fob 118, thereby selecting this handle and enabling the user to drag the fob along the rail 120.

If the response to the inquiry in decision block 420 is positive, then the user can drag the fob 118 along the rail 120 in step 425 to a desired timescale setting associated with a stop of the slider control 116. Each stop along the rail 120 can be marked by a visual indicator, such as a tick mark or an inverted triangle. As the fob 118 approaches each stop, a tool tip 148 appears denoting the timescale setting corresponding to the stop of the slider control is displayed to the user. The information presented by a tool tip 148 continues to change in step 425 as each discrete stop is encountered in response to the user dragging the fob 118 along the rail 120. At step 430, an inquiry is conducted to determine if the user has released the mouse button. If not, a loop is followed from step 430 to step 425. If the button has moved to the UP state, then the "YES" branch is followed to step 435, and the fob 118 moves proximate to the closest stop. At that point, the fob 118 is positioned at a stop closest to where the mouse button was released. In step 440, the appearance of the timescale 134 changes to reflect any new timescale settings associated with that stop. From step 440, the process then terminates at the END step.

If the response to the inquiry in decision block 420 is negative, then the "NO" branch is followed to step 445. An inquiry is conducted at decision block 445 to determine whether the cursor is placed proximate to the rail 120 of the slider control 116 while the mouse button is depressed. If not, then the "NO" branch is followed to loop back to step 420. If the inquiry in step 445 results in a positive response, however, the "YES" branch is followed from step 445 to step 450. Because the user has allowed the mouse button to transition from the up state (UP) to the depressed state (DOWN), the fob 118 snaps to the stop closest to the position of the cursor on the rail in step 450. In response to moving the fob 118 to the stop closest to the position of the cursor, the appearance of the timescale 134 changes in step 440 to reflect any new settings associated with that stop. From step 440, the process then terminates at the END step.

Figure 5:
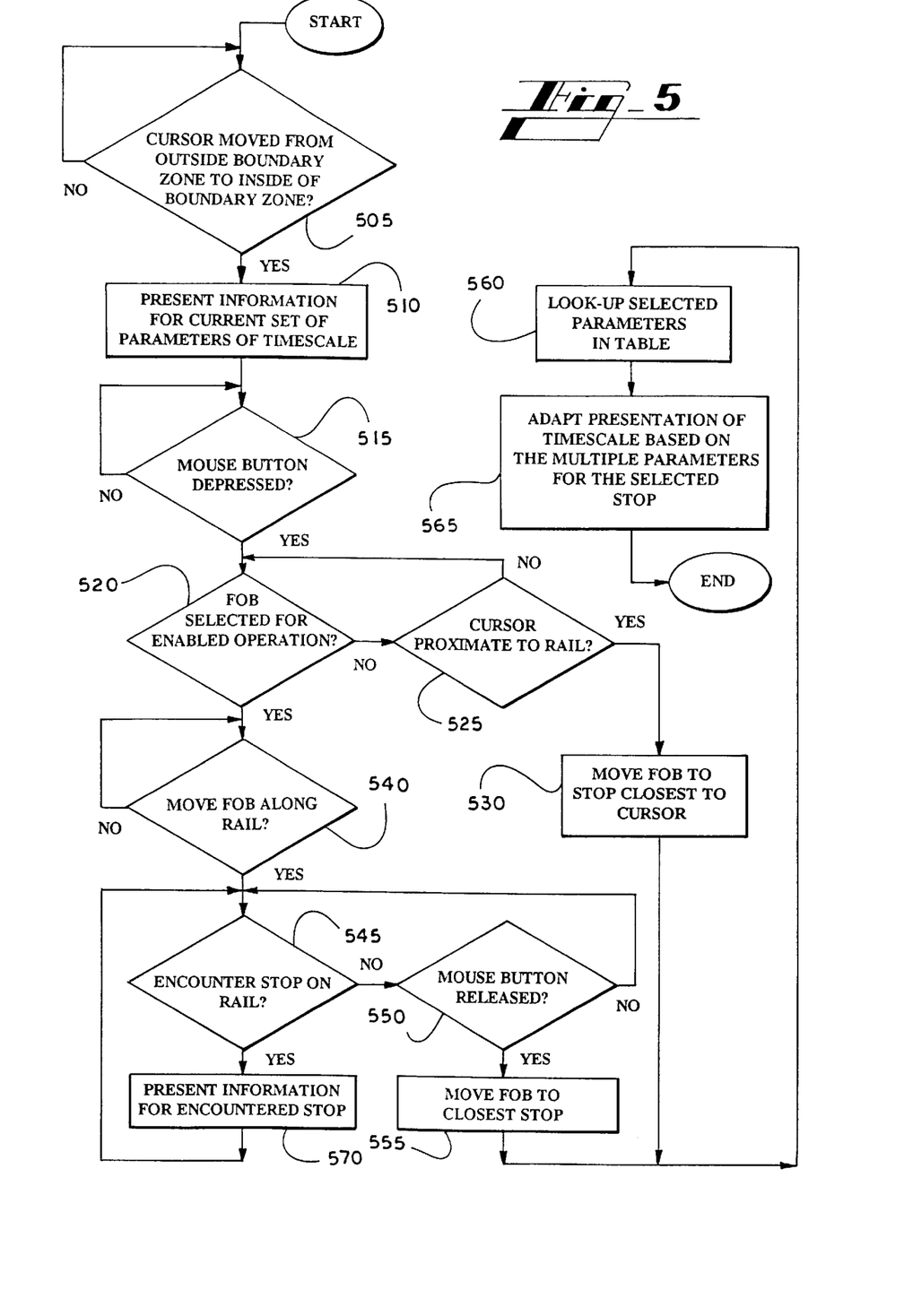
FIG. 5 is a flow diagram illustrating the steps of a computer-implemented method for controlling multiple parameters of a display item for a user interface in accordance with an embodiment of the present invention.

FIG. 5 is a logical flow diagram illustrating a computer-implemented process for controlling multiple parameters of a timescale for a user interface by use of a slider control in accordance with the preferred embodiment of the present invention. Turning now to FIG. 5, the method 500 begins at the START step and proceeds to decision block 505, where an inquiry is conducted to determine whether the cursor has enter the boundary zone defining the boundary of the slider control 116. This is achieved by comparing the cursor coordinates provided by notification messages issued by the operating system to the known position of the slider control 116. In response to determining that the cursor is positioned proximate to the slider control, the "YES" branch is followed from step 505 to step 510. In step 510, a tool tip is generated and displayed to the user via the user interface. This tool tip provides information, preferably text-based, describing the current selection of the slider control and the corresponding timescale setting of the timescale 134 within the window 100. The information presented by the tool tip is derived from the current control selection of the slider control, i.e., the stop associated with the present resting position for the fob 118. In contrast, if the response to the inquiry in decision block 505 is negative, the "NO" branch is followed to the START step, and the process begins anew.

In step 515, an inquiry is conducted to determine if the mouse button is depressed. If the mouse button remains in the UP position, then the "NO" branch is followed to complete a loop back to step 515. If the mouse button has transitioned from the UP position to the DOWN position, then the "YES" branch is followed from step 515 to decision block 520. A determination is made in decision block 520 whether the cursor 146 is positioned proximate to the fob 118 while the mouse button is depressed. If not, then the "NO" branch is followed to decision block 525, and an inquiry is conducted to determine whether the cursor is placed proximate to the rail 120 of the slider control 116 while the mouse button is depressed. If not, then the "NO" branch is followed to loop back to step 520. If the inquiry in step 525 results in a positive response, however, the "YES" branch is followed from step 525 to step 530.

In step 530, the fob 118 snaps to the stop closest to the position of the cursor on the rail because the mouse button is depressed while the cursor is placed proximate to the rail. The process then proceeds to step 560. As described below with respect to steps 560 and 565, the appearance of the timescale 134 changes to reflect any new settings associated with the present position of the fob.

If the cursor 146 is placed over the fob 118 while the mouse button is depressed, then the "YES" branch is followed from step 520 to step 540 because the fob 118 has been selected by the user and can be moved along the rail 120. In step 540, a determination is made whether the fob 118 is moving along the rail. If not, the "NO" branch returns to step 540 because the fob 118 is static. Otherwise, the fob 118 is moving, and the "YES" branch is followed from step 540 to step 545. In step 545, an inquiry is conducted to determine if the fob 118 has encountered a stop along the rail. If not, the "NO" branch is followed to step 550, wherein an inquiry is conducted to determine if the user has released the mouse button. If not, the "NO" branch is followed from step 550 to step 545. If the user has released the mouse button, the "YES" branch is followed from step 550 to step 555, and the fob 118 moves to the closest stop on the rail. A tool tip denoting the timescale setting corresponding to the current stop is presented via the user interface in step 555. Based on the position of the fob, timescale parameters are located in a lookup table to determine the appearance of the timescale in step 560. The timescale 124 is displayed with its new parameter settings in step 565. From step 565, the process then terminates at the END STEP.

If a stop has been encountered by the fob 118 on the rail 120, then the "YES" branch is followed from step 545 to step 570. A tool tip providing information describing the selection for the encountered stop is presented in step 570 to the user via the user interface. This tool tip is preferably presented adjacent to the stop that is encountered by the fob during movement of the fob along the rail. The process then returns to step 545 by following a loop from step 545 from step 570.

In view of the foregoing, it will be appreciated that the present invention provides a computer-implemented system based on use of a slider control for controlling multiple parameters of a display item, such as a timescale, to vary the appearance of the display item by a user interface. The slider control can be used to vary the appearance of the display item by selecting a control setting that is associated with desired parameters for the display item. A fob, which is selectable by the user, can be moved along the rail to select a desired control operation typically associated with a stop on the rail. The rail is typically implemented as a bar having stops, which can be depicted as tick marks at spaced intervals along the rail. An input device, such as a mouse or keyboard, can be used to select the fob in order to move it along the rail. The desired parameters for the display item can be established by selecting and dragging the fob to the corresponding stop on the rail.

To provide the user with visual cues regarding the current control state of the slider control, a "tool tip" can appear on the screen in response to moving the cursor within the boundary of the slider control. The tool tip is a label, typically implemented as a window containing text-based and/or graphical information. This information, which is provided as a "tip" to support user operations of the underlying software module, describes the controllable timescale appearance associated with the stop where the fob rests. In addition, the information of the tool tip can dynamically change in response to moving the selected fob from a first stop to a second stop. Once the user positions the fob at the desired stop, the parameters of the display item are updated, thereby modifying the appearance of the user interface.

For the foregoing, it will be appreciated that the present invention fulfills the needs of the prior art described hereinabove and meets the above-stated object and advantages. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A computer-implemented method for controlling display of a time-based display item having an associated timescale, comprising the steps of:

displaying a slider control item for controlling the timescale comprising a fob moveable along a rail having a plurality of stops, each stop associated with a set of time parameters, the fob located at a first stop associated with a first set of time parameters;

displaying the time-based display item and the associated timescale as defined by the first set of time parameters;

receiving control input moving the fob from the first stop to a second stop associated with a second set of time parameters; and in response to receiving the control input, displaying the time-based display item and the associated timescale as defined by the second set of time parameters.

2. The method of claim 1, wherein the first set of the parameters represent days, weeks, months, or years.

3. The method of claim 1, wherein the second set of the parameters represent days, weeks, months, or years.

4. The method of claim 1, further comprising the step of displaying information identifying the second set of the parameters in response to moving the fob from the first set of the parameters proximate to the stop associated with the second set of the parameters.

5. The method of claim 4, wherein the information is displayed adjacent to the stop associated with the second set of the parameters.

6. The method of claim 1, wherein the step of moving the fob comprises:

moving the fob proximate to the stop associated with the second set of parameters;

disabling the selected fob; and selecting the stop associated with the second set of parameters, wherein the stop associated with the second set of parameters represents one of the stops closest to the location of the disabled fob on the rail.

7. The method of claim 1, wherein the step of receiving control input comprises:

receiving input placing a pointer of the user interface at a selected position proximate to the rail of the slider control;

receiving a first control data set for a control of an input device while the pointer is proximate to the rail, the first control data set representing an enabled state for the control of the input device;

moving the fob to the stop associated with the second set of parameters in response to receiving a second control data set for the control of the input device, the second control data set representing a disabled state for the control of the input device, wherein the stop associated with the second set of parameters is one of the stops closest to the selected position of the pointer.

* * * * *